United States Patent [19]
Zwiep et al.

[11] 3,815,730
[45] June 11, 1974

[54] ORIENTING APPARATUS AND METHOD

[76] Inventors: Theodore C. Zwiep, 966 Parnelee N.W., Grand Rapids, Mich. 49504; John R. DenBleyker, 644½ E. 10th. St., Holland, Mich. 49423

[22] Filed: Aug. 2, 1972

[21] Appl. No.: 277,391

[52] U.S. Cl............... 198/287, 221/165, 198/273
[51] Int. Cl........................................ B65g 47/24
[58] Field of Search...... 198/33 AA, 33 R; 221/165, 221/167

[56] References Cited
UNITED STATES PATENTS

| | | | |
|---|---|---|---|
| 1,582,534 | 4/1926 | Parks | 221/167 |
| 2,219,809 | 10/1940 | Davis | 198/33 AA |
| 3,297,131 | 1/1967 | Pawlowski | 198/33 AA |
| 3,365,048 | 1/1968 | Ehrlich | 198/33 AA |
| 3,567,006 | 3/1971 | Bell | 221/165 |
| 3,687,263 | 8/1972 | Randrup | 198/33 AA |
| 3,710,921 | 1/1973 | Petiet | 198/33 AA |

FOREIGN PATENTS OR APPLICATIONS

| | | | |
|---|---|---|---|
| 1,045,490 | 10/1966 | Great Britain | 198/33 AA |

*Primary Examiner*—Richard E. Aegerter
*Attorney, Agent, or Firm*—McGarry & Waters

[57] ABSTRACT

An apparatus and method for orienting elongated headed articles such as nails and the like. A pair of rotatably mounted, horizontally disposed orienting rolls have helical grooves of opposite hand. The rolls are rotated in opposite directions and such that the surfaces of the rolls move upwardly through a slot formed between the two rolls. The elongated articles are dumped onto an orienting end of the rolls and by rotation of the rolls fall between the slot with the heads of the articles being retained between the rolls. The articles are worked into the roll grooves which mate at the slot and are moved in the grooves by rotation of the rolls to a discharge end of the rolls wherein they are removed therefrom seriatim in oriented form. The apparent motion of the mating grooves is toward the discharge end as the rolls rotate. Rejection means, such as pins or brushes on the rolls at the discharge end thereof, remove articles which are horizontally disposed between the rolls. The articles are fed to the orienting rolls by a rotating drum which surrounds the rolls. The drum has radially oriented baffles for lifting the articles and dumping the same onto the orienting end of the rolls.

15 Claims, 5 Drawing Figures

ORIENTING APPARATUS AND METHOD

BACKGROUND OF THE INVENTION

1. Field of the Invention

This invention relates to orienting of elongated headed articles for seriatim feeding thereof. In one of its aspects, the invention relates to a method for orienting elongated headed articles such as nails and arranging the same for feeding seriatim in oriented form. In another of its aspects, the invention relates to an apparatus for orienting elongated headed articles such as nails and singulating such articles in oriented condition.

2. State of the Prior Art

Nail feeding mechanisms are well known for orienting nails in a predetermined relationship and feeding the nails seriatim to nailing machines. An example of a well known nail orienting and feeding mechanism is disclosed by Morgan in U.S. Pat. No. 586,711. The Morgan orienting and feeding mechanism uses a tray which oscillates about one of its edges. Guides are provided at the pivoted edge to receive the nails as they are oriented by the oscillating tray. This apparatus is satisfactory for some operations but is too slow for operations in which many nails are used at a rapid rate. Further, the nature of the apparatus limits the number of nails which can be deposited in the tray at any given time. Hence, the tray must be frequently refilled.

In U.S. Pat. No. 169,661, there is disclosed a machine for nailing boots and shoes in which machine the nails are oriented by depositing the same on a pair of slotted bars. The nails are lifted and deposited on the slotted bars by means of a rotating drum with radial shelves. The oriented nails slide down the slotted bars to a pair of rotating augers which feed the nails to the nailing apparatus. A similar nail orienting apparatus is disclosed by Lombard in U.S. Pat. No. 481,653. These types of orienting apparatus are insufficient and inadequate to handle larger nails used in framing. With larger nails, jamming would likely take place in the slotted bars and prevent further orienting of the nails.

SUMMARY OF THE INVENTION

According to the invention, there is provided an improved apparatus for rapidly orienting nails and similar articles having a stem and an expanded head. The apparatus comprises a pair of orienting members having an orienting portion and a discharge portion, at least one of the orienting members being a roll having a helical groove. The orienting members are disposed in parallel horizontal juxtaposition with respect to each other at an operative angle to the horizontal to catch the articles in a slot therebetween. The slot has sufficient width to permit the stem of the articles to be positioned between the orienting members, yet insufficient to permit the heads of the articles to pass through the slot. The roll is mounted for rotation about its longitudinal axis and is rotated thereabout so as to move the articles within the groove from the orienting portion to the discharge portion of the orienting members. Desirably, the roll is rotated such that the surface thereof moves upwardly through the slot between the orienting members to avoid jamming of articles within the slot. Means are provided for releasing the articles positioned between the orienting members at the discharge end thereof. Further, means are provided for dumping the articles in disoriented condition onto the orienting portion of the orienting members whereby the articles on the orienting end of the roll fall within the slot therebetween, are engaged by the groove of the roll and are moved to the discharge end of the orienting members by the groove as the roll rotates.

Preferably, the other orienting member includes a second roll having a helical groove of opposite hand to the first roll and in mating alignment at the slot with the helical groove of the first roll, and means are provided for rotating the second roll in a direction opposite to that of the first roll. Desirably, means at the discharge portion of the orienting members reject articles disposed horizontally between the orienting members. The slot between the orienting members decreases in width between the orienting portion and the discharge portion so that the grooves in the rolls separate and move the nails or articles therein. A reduced diameter portion of the rolls at the discharge portion thereof widens the slot sufficiently to permit the heads of the articles to pass between the first and second rolls. A pair of guide bars is provided to catch the articles as they are released by the orienting rolls, the guide bars being inclined so that the oriented articles move seriatim down the guide bars and away from the orienting rolls under the influence of gravity.

A drum having inwardly directed shelves or baffles surrounds the orienting members and is rotated thereabout to raise the articles and dump the same onto the orienting members. Helically shaped baffles within the drum move the articles from an end thereof adjacent the discharge portion of the orienting members to the end adjacent to the orienting portion of the rolls.

Still further, according to the invention, there is provided a method for orienting and singulating elongated headed articles such as nails for feeding the same seriatim in a predetermined orientation. The method comprises the steps of depositing the articles in disoriented condition onto a pair of orienting members in horizontal juxtaposition in operative position to receive the articles in a slot therebetween. At least one of the orienting members is a roll having a helical groove for receiving the stems of articles with the heads thereof retained on top of the orienting members. The roll is rotated to cause the articles to fall into the slot between the orienting members with the heads thereof retained above the roll. The articles are then positioned in the groove and are moved to a discharge end of the orienting members by rotation of the roll. The articles are released seriatim from the discharge end of the orienting members. Desirably, the roll is rotated such that the surface thereof moves upwardly through the slot to prevent jamming of the articles between the orienting members. Further, the method includes the step of rejecting articles positioned horizontally between the orienting members at the discharge end thereof.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
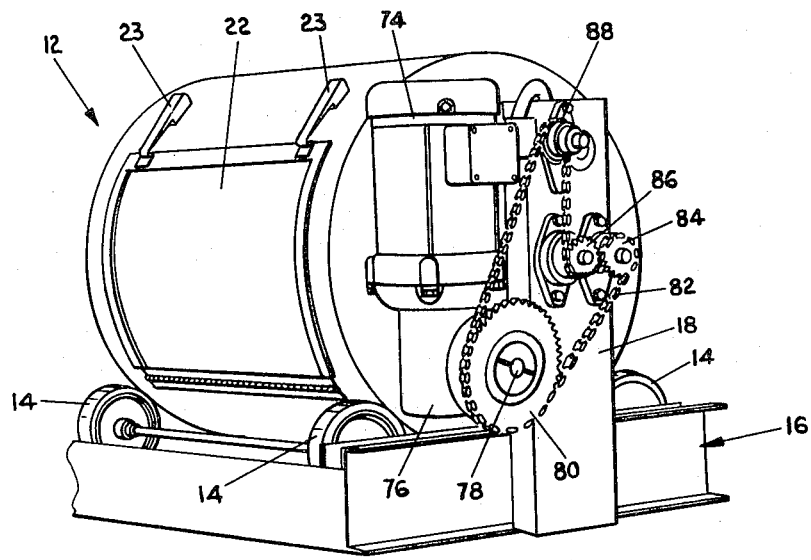
FIG. 1 is a side perspective view of the orienting apparatus according to the invention.

Referring now to the drawings, and in particular to FIG. 1, there is illustrated a cylindrical hopper 12 supported for rotation about a horizontal axis on a plurality of wheels 14. A rectangular frame 16 rotatably supports the wheels and in turn supports the cylindrical hopper 12. Upright members 18 and 20 are secured to the frame 16. The cylindrical hopper has a door 22 having releasable latches 23 for feeding nails into the hopper.

Figure 2:
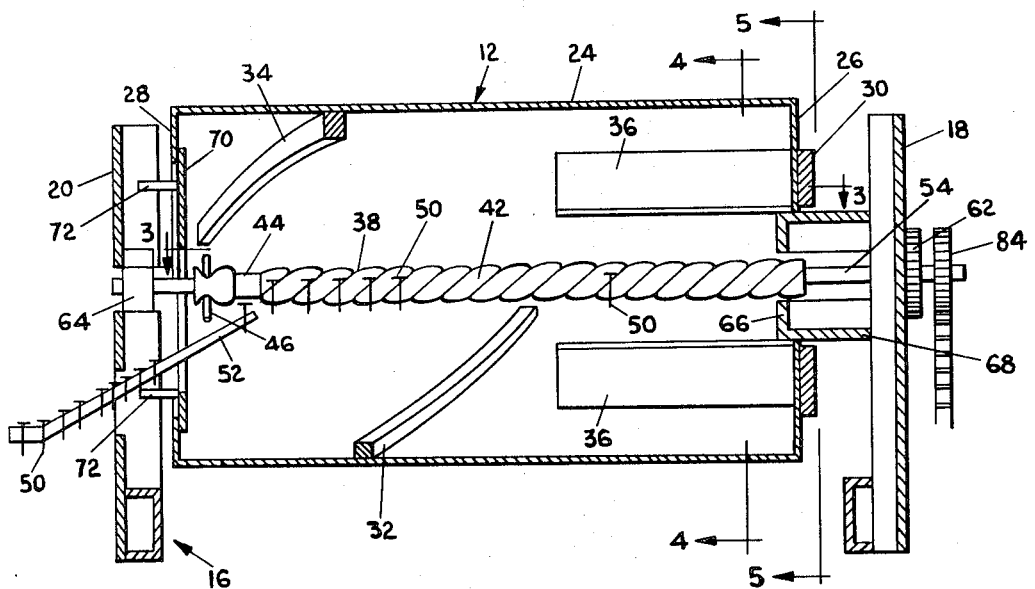
FIG. 2 is a side elevational view in section of the apparatus illustrated in FIG. 1.
Figure 3:
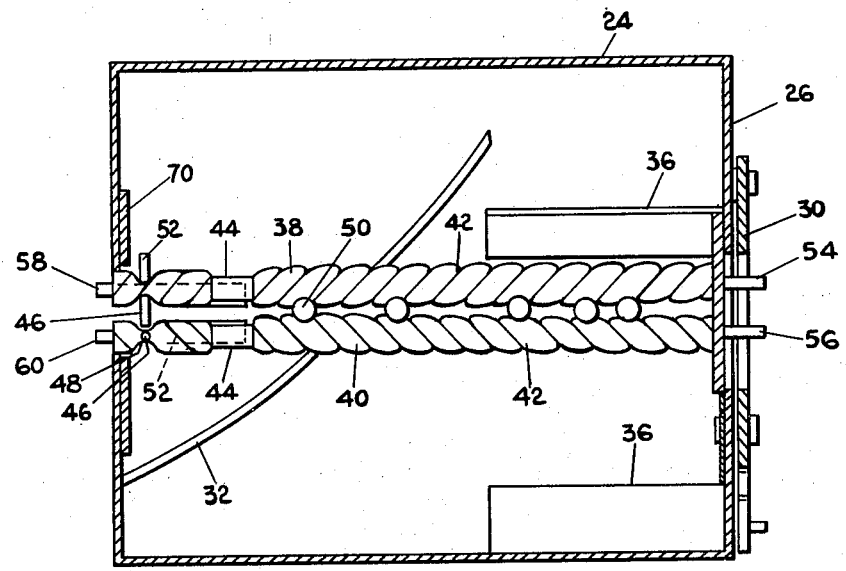
FIG. 3 is a plan view taken along lines 3—3 of FIG. 2.
Figure 4:
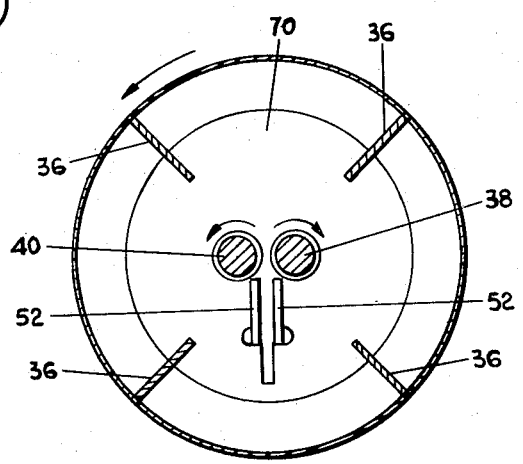
FIG. 4 is a partial sectional view taken along lines 4—4 of FIG. 2.

Referring now to FIGS. 2 - 4, the cylindrical hopper 12 is formed of a cylindrical casing 24 having a pair of annular end plates 26 and 28. A gear sprocket wheel 30 is secured to the annular end plate 26. A pair of helical shaped baffles 32 and 34 are mounted within the interior of the cylindrical casing 24 to move nails therein to the right end of the cylindrical hopper 12 as viewed in FIGS. 2 and 3. A plurality of inwardly projecting lifting baffles 36 are also provided at the right end of the hopper 12 for lifting nails upwardly from the bottom of the hopper and dumping the nails onto a pair of elongated cylindrical orienting rolls 38 and 40. Each of the rolls 38 and 40 is provided with machined helical grooves 42 from an orienting end at the right hand end of the hopper as seen in FIGS. 2 and 3 to a discharge end having a reduced diameter section 44 near the opposite end thereof. The machined groove 42 of the orienting roll 38 is opposite in hand to the machined groove 42 in the orienting roll 40. The rolls 38 and 40 are rotated about their longitudinal axes in opposite directions so that corresponding grooves in each of the rolls will carry nails 50 positioned therein from the right to the left as seen in FIGS. 2 and 3. Further, the surface of each of the rolls moves upwardly in the gap between the rolls so that nails do not become wedged within the grooves as the rolls turn. In other words, as seen in FIG. 4, roll 38 rotates in a clockwise direction and roll 40 rotates in a counterclockwise direction as indicated by the arrows.

The rolls 38 and 40 are spaced apart to define a slot therebetween so that the stem of nails will fall into the slot with the head of the nails resting on top of the rolls. The diameter of each of the rolls 38 and 40 increases slightly between a central portion of the rolls and the reduced diameter section 44 so that the slot between the rolls narrows. In this manner, the nails are controlled more positively and separated into the grooves as they move toward the reduced diameter section 44. As illustrated in FIG. 3, the grooves 42 of each of the rolls 38 and 40 are aligned so that each nail rides in a corresponding groove of each of the rolls 38 and 40. Pins 46 extend radially from the extreme left end of the orienting rolls 38 and 40 and rotate therewith. A corresponding notch 48 is formed in both rolls 38 and 40 to permit the pins 46 to rotate past the rolls 52. In lieu of the pins 46, radial and interspaced brushes can be employed to remove the horizontal nails from the rolls.

A pair of inclined guide bars 52 are secured to upright member 20 and extend into the hopper, terminating at a point below the reduced sections 44 of the orienting rolls 38 and 40. The heads of the nails 50 are smaller than the distance between the rolls 38 and 40 at the reduced diameter sections 44 and the nails therefor drop between the rolls at the reduced diameter section 44. The nails are received between the inclined guide bars 52 as illustrated in FIG. 2. In this manner, the nails are oriented and fed seriatim to a nailing device (not shown). A picker device (not shown) may be provided to transfer the nails from the bottom of the guide bars 52 to the nailing device.

The rollers 38 and 40 have journals 54 and 56 at one end, respectively, and journals 58 and 60 at the other end, respectively. Bearings 62 and 64 support the journals in upright members 18 and 20, respectively. A stationary end plate 66 is supported in the right hand end of the hopper through support members 68. The end plate 66 closes off the space in the end of the hopper between the rolls 38 and 40 and the annular end plate 26. Similarly, a stationary plate 70 is supported by upright member 20 through brackets 72. The stationary plate 70 closes off the circular area inside of the annular end plate 28 and has an opening to permit the guide bars 52 and the nails therein to pass therethrough.

Figure 5:
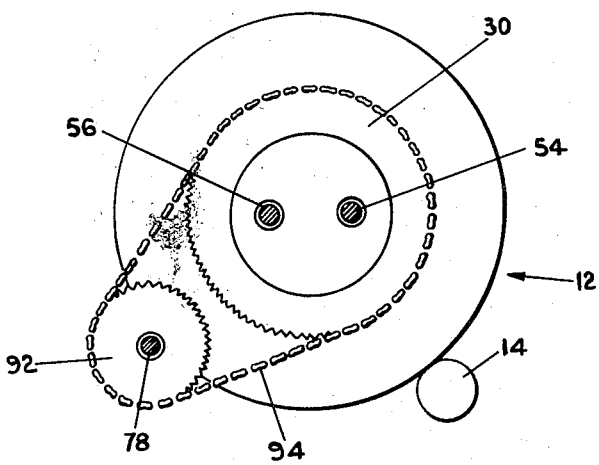
FIG. 5 is a partial sectional view taken along lines 5—5 of FIG. 2.

Referring now again to FIG. 1 and to FIG. 5, a drive motor 74 is mounted on the upright 18. A gear reducer 76 is coupled to the output from the drive motor 74 and has an output shaft 78. The output shaft 78 drives a sprocket wheel 80 which in turn drives a chain 82 around sprocket wheels 84, 86 and idler sprocket 88. Sprocket wheels 84 and 86 are fixed on the ends of journals 54 and 56 respectively to drive the orienting rollers 38 and 40 respectively. The output shaft 78 of the gear reducer 76 also drives a sprocket wheel 92 (FIG. 5). A chain 94 engages the sprocket wheel 92 to drive the cylindrical hopper 12 through sprocket 30.

In operation, as the nails are dumped onto the rotating rolls 38 and 40, they assume various positions on the rolls, with some nails falling back into the bottom of the cylindrical casing 24. The rotation of the rolls away from the slot quickly throws off all nails which do not have an orientation favorable to dropping into the slot. Others of the nails are urged to vertical positions by the rotation of the rolls, with the stems of the nails being positioned within the grooves 42. The rotation of the mating helical grooves in the rolls 38 and 40 serves to move the nails from the orienting end at the right hand side of the hopper to the discharge end of the rolls at the reduced section 44. In the event that for some reason nails are horizontally disposed on top of the rolls and are not thrown off by the rotation of the rolls, the nails will also be fed to the discharge end of the hopper. When the nail reaches the extreme left hand end of the hopper, pins 46 will contact the nail and throw it off the rolls and onto the bottom of the cylindrical casing 24. Preferably, the top of the guide bars 52 is spaced slightly below the rolls 38 and 40 to catch the nails, but also to permit the passage of the nails between the orienting rolls 38 and 40 and the inclined guide bars 52 in the event the guide bars 52 are full of nails. Thus, in the event that the guide bars 52 are full of nails, the succeeding nails will be deflected by the top nail in the guide bars to fall between the orienting rollers 38 and 40 and the top of the guide bars 52 into the bottom of the casing 24 for recycle.

The orienting rolls of the invention provide a means of operating positively on the nails or similar articles to arrange the same into a predetermined orientation and for feeding the same seriatim to an apparatus which uses them. Further, the orienting process takes place very rapidly and feeds the nails very rapidly for use by the nailing machine. Still further, large loads of nails, for example, up to 50 lbs. of nails, can be deposited in the rotating hopper at any given time. This means that less time need be spent in loading the hopper.

Reasonable variation and modification are possible within the scope of the foregoing disclosure, the drawings, and the appended claims without departing from the spirit of the invention. For example, the invention has been described with reference to a preferred embodiment in which a pair of rolls have helical grooves of opposite hand. However, it is within a broader scope of the invention to include a single roll with a helical groove or threads juxtaposed to a bar, or to a second stationary roll, or to a second roll, rotating in a direction opposite to that of the grooved roll. In fact, a single grooved roll could be used in conjunction with a guide surface. Further, the orienting rolls have been shown to be disposed horizontally. The rolls can be disposed at an angle to the horizontal if desired so long as the rolls are in operative position to catch the nails or articles therebetween. Other such modifications will be suggested to those having ordinary skill in the art to which the invention pertains.

The embodiments of the invention in which an exclusive property or privilege is claimed are defined as follows:

1. An apparatus for orienting articles having a stem and an expanded head, said apparatus comprising:
    a pair of orienting members having an orienting portion and a discharge portion, at least one of said members being a roll having a helical groove therein;
    means mounting said orienting members in horizontal juxtaposition to each other, leaving a slot therebetween, said slot being sufficiently wide in said orienting portion to permit the stem of said articles to be positioned between said orienting members, yet insufficient to permit the heads of said articles to pass through said slot;
    means mounting said roll for rotation about its longitudinal axis;
    means for rotating said roll about its longitudinal axis so as to move articles within said groove from said orienting portion to said discharge portion thereof;
    means for releasing articles positioned between said orienting members at said discharge end thereof;
    means for dumping said articles in disoriented condition onto said orienting portion of said orienting members, said article dumping means including a hopper having an enclosed continuous surface surrounding said orienting members, said hopper having a dumping end surrounding said orienting portion of said orienting members, and a recycle end surrounding said discharge portion of said orienting members; means in said dumping end for carrying said articles upwardly and dumping said articles onto said orienting portion of said orienting members; and means in said recycle end of said hopper for moving articles from said recycle end to said dumping end;
    means mounting said hopper for rotational movement about a substantially horizontal axis and with said continuous surface revolving around said orienting portion of said orienting member; means for rotating said hopper about said substantially horizontal axis; and
    means for receiving articles in oriented condition from said releasing means of said orienting members;
    whereby said articles dumped on said orienting members by said rotating hopper fall within said slot in an oriented condition, are engaged by said grooves in said roll, and are moved to said discharge end of said orienting means.

2. An apparatus for orienting articles according to claim 1 wherein said rotating means rotates said roll such that the surface thereof moves upwardly through said slot to prevent jamming of articles therein.

3. An apparatus for orienting articles according to claim 2 wherein the other of said orienting members includes a second roll having a helical groove of opposite hand to that of said first roll and in alignment with said helical groove of said first roll; and further comprising means for rotating said second roll in a direction opposite to that of said first roll.

4. An apparatus for orienting articles according to claim 3 and further comprising rotating means on at least one of said orienting members at said discharge portion for removing articles disposed horizontally between said orienting members so that said articles fall back into said hopper.

5. An apparatus for orienting articles according to claim 3 wherein said first and second rolls have a section in which the diameter increases slightly in a tapered fashion between said orienting portion and said discharge portion whereby said rolls operate more positively on said articles within said grooves as said articles move from said orienting end to said discharge end of said rolls.

6. An apparatus for orienting articles according to claim 3 wherein said releasing means includes a reduced diameter portion of said first and second rolls to widen said slot sufficiently to permit said heads of said articles to pass between said first and second rolls.

7. An apparatus for orienting articles according to claim 6 wherein said receiving means includes a pair of inclined spaced guide members terminating at an upper portion just beneath said first and second rolls at said releasing means, said guide members being spaced sufficiently to permit free reception of said article stems while retaining said article heads above said guide members, the lower ends of said guide members extending out one end of said hopper, whereby said articles discharged from said orienting members are received by said guide members and slide down said guide members away from said orienting members and out of said rotating hopper.

8. An apparatus for orienting articles according to claim 7 wherein said upper portion of said guide members are spaced a sufficient distance beneath said orienting rolls to permit articles to pass between said guide members and said orienting rolls after discharge from said releasing means when said guide members are full of said articles.

9. An apparatus for orienting articles according to claim 1 wherein said moving means includes at least one helical baffle within said hopper; and said article carrying and dumping means includes radial baffles aligned longitudinally within said hopper.

10. An apparatus for orienting articles according to claim 1 and further comprising rotating means on at least one of said orienting members at said discharge portion thereof for rejecting articles disposed horizontally between said orienting members.

11. An apparatus for orienting articles according to claim 1 wherein a section of said slot formed between said orienting members decreases in width between said orienting portion and said discharge portion of said orienting members to achieve better control over said articles as they move from said orienting portion to said discharge portion.

12. An apparatus for orienting articles according to claim 1 wherein said releasing means includes a reduced diameter portion of said first roll to widen said slot sufficiently to permit said head of said article to pass between said first and second rolls.

13. An apparatus for orienting articles according to claim 1 wherein said receiving means includes a pair of inclined guide members spaced from each other sufficiently to permit free reception of said article stems therebetween while retaining said article heads above said guide members, said guide members terminating at an upper portion just beneath said orienting members at said discharge portion thereof, whereby said articles are received by said guide members as they are discharged by said orienting means.

14. An apparatus for orienting articles having a stem and an expanded head, said apparatus comprising:
a pair of orienting members having an orienting portion and a discharge portion, at least one of said members being a roll having a helical groove therein;
means mounting said orienting members in horizontal juxtaposition to each other, leaving a slot therebetween, said slot being sufficiently wide in said orienting portion to permit the stem of said articles to be positioned between said orienting members, yet insufficient to permit the heads of said articles to pass through said slot;
means mounting said roll for rotation about its longitudinal axis;
means for rotating said roll about its longitudinal axis so as to move articles within said groove from said orienting portion to said discharge portion thereof;
means for releasing articles positioned between said orienting members at said discharge end thereof;
means for dumping said articles in disoriented condition onto said orienting portion of said orienting members;
means for receiving said articles in orienting condition from said releasing means of said orienting members; and
means for rejecting articles from said receiving means when said receiving means is full of said articles while releasing said articles from said releasing means so as to avoid jamming of said orienting members.

15. An apparatus for orienting articles according to claim 14 wherein said receiving means includes a pair of inclined spaced guide members terminating at an upper portion just beneath said releasing means of said orienting members, said guide members being spaced sufficiently to permit free reception of said article stems while retaining said article heads above said guide members, and wherein said article rejecting means includes a spacing between the upper portion of said guide members and said orienting members to permit articles to pass between said guide members and said orienting members after discharge from said releasing means when said guide means are full of said articles.

* * * * *